(12) United States Patent
Hirano

(10) Patent No.: US 11,060,192 B2
(45) Date of Patent: Jul. 13, 2021

(54) METAL-CERAMIC BASE MATERIAL, METAL-CERAMIC JOINT STRUCTURE, METHOD FOR PRODUCING METAL-CERAMIC JOINT STRUCTURE, AND MIXED POWDER MATERIAL

(71) Applicant: TATSUTA ELECTRIC WIRE & CABLE CO., LTD., Higashiosaka (JP)

(72) Inventor: Masaki Hirano, Kizugawa (JP)

(73) Assignee: TATSUTA ELECTRIC WIRE & CABLE CO., LTD., Osaka (JP)

( * ) Notice: Subject to any disclaimer, the term of this patent is extended or adjusted under 35 U.S.C. 154(b) by 371 days.

(21) Appl. No.: 15/953,598

(22) Filed: Apr. 16, 2018

(65) Prior Publication Data

US 2019/0003059 A1     Jan. 3, 2019

(30) Foreign Application Priority Data

Jul. 3, 2017  (JP) .............................. JP2017-130308

(51) Int. Cl.
*C23C 24/04* (2006.01)
*B32B 15/20* (2006.01)
(Continued)

(52) U.S. Cl.
CPC .............. *C23C 24/04* (2013.01); *B32B 15/04* (2013.01); *B32B 15/20* (2013.01); *C04B 37/023* (2013.01);
(Continued)

(58) Field of Classification Search
CPC ..... C23C 24/04; C04B 37/023; C04B 37/026; C04B 2237/12; C04B 2237/121; C04B 2237/123
See application file for complete search history.

(56) References Cited

U.S. PATENT DOCUMENTS 4,763,828 A * 8/1988 Fukaya ................. C04B 37/026
                                                    228/124.1
5,362,523 A * 11/1994 Gorynin .................... C23C 4/02
                                                    427/446
(Continued)

FOREIGN PATENT DOCUMENTS

EP    2009141 A2   12/2008
EP    3396021 A1   10/2018
(Continued)

OTHER PUBLICATIONS

Messler?W et al:"A Model for Designing . . . " Welding Journal, American Welding Society, Miami, FL, US, vol. 7,No. 5, May 1, 1995, pp. 160-S.

(Continued)

*Primary Examiner* — Jasper Saberi
(74) *Attorney, Agent, or Firm* — Harness Dickey & Pierce P.L.C.

(57) ABSTRACT

The present invention provides a metal-ceramic base material and the like which allow a ceramic base material and a desired metal material to be easily joined. A metal-ceramic base material (30) to be joined to a metal material (40), includes: a ceramic base material (20); and a metal film (25) provided on the ceramic base material (20), the metal film (25) being formed by thermal spray of a mixed powder material containing aluminum, alumina, and nickel, at least part of the nickel being exposed on a surface of the metal film (25).

8 Claims, 11 Drawing Sheets

(51) Int. Cl.
*B32B 15/04* (2006.01)
*C04B 37/02* (2006.01)

(52) U.S. Cl.
CPC .... *C04B 37/026* (2013.01); *C04B 2235/5216* (2013.01); *C04B 2235/5436* (2013.01); *C04B 2237/064* (2013.01); *C04B 2237/12* (2013.01); *C04B 2237/121* (2013.01); *C04B 2237/122* (2013.01); *C04B 2237/123* (2013.01); *C04B 2237/124* (2013.01); *C04B 2237/125* (2013.01); *C04B 2237/126* (2013.01); *C04B 2237/34* (2013.01); *C04B 2237/341* (2013.01); *C04B 2237/343* (2013.01); *C04B 2237/346* (2013.01); *C04B 2237/348* (2013.01); *C04B 2237/366* (2013.01); *C04B 2237/368* (2013.01); *C04B 2237/405* (2013.01); *C04B 2237/406* (2013.01); *C04B 2237/58* (2013.01); *C04B 2237/72* (2013.01)

(56) References Cited

U.S. PATENT DOCUMENTS

| | | | | |
|---|---|---|---|---|
| 6,503,575 | B1* | 1/2003 | Payne | C23C 4/02 427/447 |
| 2006/0172073 | A1 | 8/2006 | Groza et al. | |
| 2006/0233951 | A1* | 10/2006 | DeBiccari | C23C 24/04 427/180 |
| 2007/0215677 | A1 | 9/2007 | Floyd et al. | |
| 2011/0065973 | A1 | 3/2011 | Fernie et al. | |
| 2014/0134448 | A1 | 5/2014 | Yamauchi et al. | |
| 2014/0226284 | A1 | 8/2014 | Yamauchi et al. | |
| 2016/0172713 | A1* | 6/2016 | Kumar | B23K 1/20 228/124.5 |

FOREIGN PATENT DOCUMENTS

| | | |
|---|---|---|
| JP | S60-131875 A | 7/1985 |
| JP | 2010228991 A | 10/2010 |
| JP | 2012153581 A | 8/2012 |
| JP | 201318190 A | 1/2013 |
| JP | 201374199 A | 4/2013 |
| WO | WO-2017/110985 A1 | 6/2017 |

OTHER PUBLICATIONS

Harminder Singh et al: "Cold Spray technology . . . " Frattura ed Integrita Strutturale, Sep. 30, 2012, pp. 69-8408.

European Search Report dated Nov. 13, 2018.

Japanese Office Action and English translation thereof dated Mar. 17, 2020.

* cited by examiner

⇨ : FLOW OF CARRIER GAS

⇨ : FLOW OF MIXED POWDER MATERIAL

⮕ : FLOW OF CARRIER GAS + MIXED POWDER MATERIAL (a)

(b)

(c)

(a)

(b)

(c)

| MIXED POWDER OF Al, $Al_2O_3$, AND Ni | | $Al_2O_3$ | | | |
|---|---|---|---|---|---|
| | | 0% | 16% | 32% | 39% |
| Al | 0% | Bad (Ni:100%) | — | Bad (Ni:68%) | — |
| | 7% | — | Not Good (Ni:77%) | — | Good (Ni:54%) |
| | 14% | Not Good (Ni:86%) | — | Good (Ni:54%) | — |

METAL-CERAMIC BASE MATERIAL, METAL-CERAMIC JOINT STRUCTURE, METHOD FOR PRODUCING METAL-CERAMIC JOINT STRUCTURE, AND MIXED POWDER MATERIAL

This Nonprovisional application claims priority under 35 U.S.C. § 119 on Patent Application No. 2017-130308 filed in Japan on Jul. 3, 2017, the entire contents of which are hereby incorporated by reference.

TECHNICAL FIELD

The present invention relates to a metal-ceramic base material, a metal-ceramic joint structure, a method for producing the metal-ceramic joint structure, and a mixed powder material.

BACKGROUND ART

In the field of electronics, electrical components and electrical circuits are becoming increasingly reduced in size and weight in recent years. Accordingly, there are increasing demands such as a demand for conducting a surface treatment (surface modification) of a micro-region and a demand for forming an electrode in a micro-region.

In order to meet such demands, great attention has been paid in recent years to a method for forming a film with use of a thermal spray method. For example, a cold spray method, which is a type of thermal spray method, is a method for (1) causing a carrier gas whose temperature is lower than a melting point or a softening temperature of a film material to flow at a high speed, (2) introducing the film material into the flow of the carrier gas and then increasing the speed of the carrier gas into which the film material has been introduced, and (3) forming a film by causing the film material to collide with, for example, a base material at a high speed while the film material is in a solid phase.

There has been developed a technique in which the cold spray method is used for joining a ceramic base material and a metal material. The ceramic base material is a molded body of an inorganic compound, and has a high hardness. This characteristic is utilized so as to replace a metal component with the ceramic base material whose hardness is higher than that of the metal component. This allows improving wear resistance of a component or a product, and increasing a life of the component or the product, accordingly. As an example of such a technique, Patent Literature 1 has been disclosed.

Patent Literature 1 discloses a method for joining a ceramic base material and aluminum through the following steps (a) through (c).

(a) Aluminum powder is supplied into a carrier gas which has been heated to a temperature of 200° C. to 400° C.

(b) An aluminum film is formed on a ceramic base material by the cold spray method.

(c) The aluminum film is attached to aluminum or an aluminum alloy by soldering.

Patent Literatures 2 through 4 also disclose techniques similar to the technique above.

CITATION LIST

Patent Literature

[Patent Literature 1]
Japanese Patent Application Publication, Tokukai, No. 2012-153581 (Publication Date: Aug. 16, 2012)

[Patent Literature 2]
Japanese Patent Application Publication, Tokukai, No. 2013-18190 (Publication Date: Jan. 31, 2013)

[Patent Literature 3]
Japanese Patent Application Publication, Tokukai, No. 2010-228991 (Publication Date: Oct. 14, 2010)

[Patent Literature 4]
Japanese Patent Application Publication, Tokukai, No. 2013-74199 (Publication Date: Apr. 22, 2013)

SUMMARY OF INVENTION

Technical Problem

However, the techniques disclosed in Patent Literatures 1 through 4 have the following problems (1) through (3).

(1) A case in which two metal surfaces are joined with use of silver solder BAg-7 (JIS.Z.3261) is considered. A temperature at which soldering with use of the silver solder BAg-7 is performed (650° C. to 760° C.) is higher than a melting point of aluminum (660° C.). Accordingly, when used in the above step (c), the silver solder BAg-7 causes the aluminum to melt. As such, in the techniques disclosed in Patent Literature 1 etc., an aluminum film and aluminum or an aluminum alloy cannot be joined by silver soldering.

(2) A ceramic base material and an aluminum film significantly differ in linear expansion coefficient. Accordingly, heating a ceramic base material on which an aluminum film has been formed may cause the aluminum film to peel off from the ceramic base material due to a difference between the linear expansion coefficients of the ceramic base material and the aluminum film.

(3) Under conventional technology, it is difficult to form a film of a desired metal (e.g., nickel) directly on a ceramic base material. As such, in order to form a nickel film on a ceramic base material, it is necessary to form an aluminum film on the ceramic base material first, and then form the nickel film on the aluminum film. That is, in order to form a nickel film on a ceramic base material, it is necessary to form an aluminum film between the ceramic base material and the nickel film. In this two-layer structure, peeling tends to occur between two layers (the nickel film and the aluminum film).

The present invention is accomplished in view of the foregoing problem. An object of the present invention is to provide a metal-ceramic base material, a metal-ceramic joint structure, a method for producing the metal-ceramic joint structure, and a mixed powder material each of which allows a ceramic base material and a desired metal material to be easily joined.

Solution to Problem

In order to attain the object, a metal-ceramic base material in accordance with the present invention is a metal-ceramic base material to be joined to a metal material, including: a ceramic base material; and a metal film provided on the ceramic base material, the metal film being formed by thermal spray of a mixed powder material containing aluminum, alumina, and nickel, at least part of the nickel being exposed on a surface of the metal film.

According to the configuration above, at least part of the nickel is exposed on the surface of the metal film. A melting point of nickel is 1453° C., which is higher than a soldering temperature of generally used silver solder. Accordingly, it becomes possible to join the metal-ceramic base material and the metal material by silver soldering.

Further, the metal film is a film formed by thermally spraying, onto the ceramic base material, the mixed powder material containing the aluminum, the alumina, and the nickel, and therefore is constituted by a single layer. Accordingly, it also becomes possible to prevent a conventional problem that two layers (an aluminum layer and a nickel layer) peel off from each other.

In order to attain the object, a metal-ceramic joint structure in accordance with the present invention is a metal-ceramic joint structure including: a ceramic base material; a metal film provided on the ceramic base material, the metal film being formed by thermally spraying a mixed powder material containing aluminum, alumina, and nickel, at least part of the nickel being exposed on a surface of the metal film; and a metal material joined to the metal film.

According to the configuration above, it is possible to achieve an effect similar to that of the metal-ceramic base material.

In order to attain the object, a method, in accordance with the present invention, for producing a metal-ceramic joint structure is a method for producing a metal-ceramic joint structure, including: a film forming step of thermally spraying a mixed powder material onto a ceramic base material so as to form a metal film on the ceramic base material, the mixed powder material containing aluminum, alumina, and nickel; and a joining step of joining the metal film and a metal material.

According to the configuration above, it is possible to achieve an effect similar to that of the metal-ceramic base material.

In order to achieve the object, a mixed powder material in accordance with the present invention is a mixed powder material to be thermally sprayed onto a ceramic base material, including: a plurality of alumina particles; a plurality of aluminum particles; and a plurality of nickel particles, an average air resistance against the plurality of alumina particles being smaller than an average air resistance against the plurality of aluminum particles, the average air resistance against the plurality of aluminum particles being smaller than an average air resistance against the plurality of nickel particles.

According to the configuration above, it is possible to achieve an effect similar to that of the metal-ceramic base material.

Advantageous Effects of Invention

The present invention makes it possible to join a metal-ceramic base material and a metal material by silver soldering.

DESCRIPTION OF EMBODIMENTS

Embodiments are described below with reference to the drawings. In the following description, identical components and identical constituent elements are given respective identical reference signs. Such components and constituent elements are also identical in name and function. Thus, a specific description of those components and constituent elements is not repeated.

EMBODIMENTS

Figure 2:
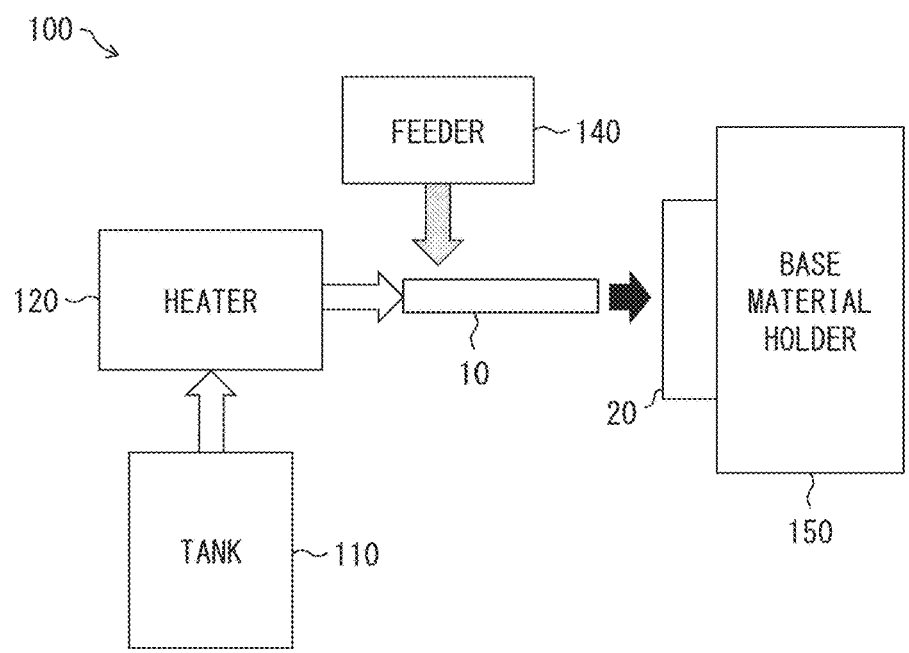
FIG. 2 is a view schematically illustrating a cold spray device in accordance with an embodiment of the present invention.

Firstly, the following description will discuss a cold spray device 100 with reference to FIG. 2.

The cold spray method is roughly classified into high-pressure cold spraying and low-pressure cold spraying, depending on working gas pressures. The cold spray device 100 can be applied to both the high-pressure cold spraying and the low-pressure cold spraying.

[Cold Spray]

In recent years, a film forming method that is called a cold spray method has been used. The cold spray method is a method for causing a carrier gas whose temperature is lower than a melting point or a softening temperature of a film material to flow at a high speed, introducing the film material into the flow of the carrier gas and then increasing the speed of the carrier gas into which the film material has been introduced, and forming a film by causing the film material to collide with, for example, a base material at a high speed while the film material is in a solid phase.

A principle of film formation by the cold spray method is understood as below.

A collision speed of not less than a certain critical value is required for a film material to adhere to and accumulate on a base material so as to form a film. Such a collision speed is referred to as a critical speed. In a case where the film material collides with the base material at a speed that is less than the critical speed, the base material is worn, so that small crater-shaped cavities are merely formed in the substrate. The critical speed is changed by, for example, a material, a size, a shape, a temperature, and/or an oxygen content of the film material, or a material of the base material.

In a case where the film material collides with the base material at a speed that is not less than the critical speed, plastic deformation caused by a great shearing force occurs near an interface between the film material and the base material (or the film which has already been formed). The plastic deformation and generation of a great shock wave in a solid due to the collision cause an increase in temperature near the interface, and in this process, solid phase bonding occurs between the film material and the base material and between the film material and the film (or the film material which has already adhered to the base material).

(Cold Spray Device 100)

FIG. 2 is a view schematically illustrating the cold spray device 100. As illustrated in FIG. 2, the cold spray device 100 includes a tank 110, a heater 120, a spray nozzle 10, a feeder 140, a base material holder 150, and a control device (not illustrated).

The tank 110 stores therein a carrier gas. The carrier gas is supplied from the tank 110 to the heater 120. Examples of the carrier gas include nitrogen, helium, air, or a mixed gas of nitrogen, helium, and air. A pressure of the carrier gas is adjusted so that the pressure is, for example, not less than 70 PSI and not more than 150 PSI (not less than approximately 0.48 Mpa and not more than approximately 1.03 Mpa) at an exit of the tank 110. Note, however, that the pressure of the carrier gas at the exit of the tank 110 does not necessarily need to fall within the above range, and is appropriately adjusted in accordance with, for example, material(s) and/or a size of a film material, or material(s) of a base material.

The heater 120 heats the carrier gas which has been supplied from the tank 110. More specifically, the carrier gas is heated to a temperature that is lower than a melting point of the film material which is supplied from the feeder 140 to the spray nozzle 10. For example, the carrier gas which is subjected to measurement at an exit of the heater 120 is heated to a temperature in a range of not less than 50° C. and not more than 500° C. Note, however, that a heating temperature of the carrier gas does not necessarily need to fall within the above range, and is appropriately adjusted in accordance with, for example, the material(s) and/or the size of the film material, or the material(s) of the base material.

The carrier gas is heated by the heater 120 and then is supplied to the spray nozzle 10.

The spray nozzle 10 (i) causes an increase in speed of the carrier gas which has been heated by the heater 120 to a speed in a range of not less than 300 m/s and not more than 1200 m/s and (ii) causes the carrier gas to be sprayed therethrough onto a base material 20. Note, however, that the speed of the carrier gas does not necessarily need to fall within the above range, and is appropriately adjusted in accordance with, for example, the material(s) and/or the size of the film material, or the material(s) of the base material.

The feeder 140 supplies the film material to the flow of the carrier gas whose speed is increased by the spray nozzle 10. The film material which is supplied from the feeder 140 has a particle size of, for example, not less than 1 µm and not more than 50 µm. Together with the carrier gas, the film material which has been supplied from the feeder 140 is sprayed through the spray nozzle 10 onto the base material 20.

The base material holder 150 fixes the base material 20. Onto the base material 20 which has been fixed by the base material holder 150, the carrier gas and the film material are sprayed through the spray nozzle 10. A distance between a surface of the base material 20 and a tip of the spray nozzle 10 is adjusted so that the distance falls within a range of, for example, not less than 1 mm and not more than 30 mm. In a case where the distance between the surface of the base material 20 and the tip of the spray nozzle 10 is less than 1 mm, a spraying speed at which the film material is sprayed is decreased. This is because the carrier gas sprayed from the spray nozzle 10 flows back into the spray nozzle 10. At this time, a pressure generated when the carrier gas flows back may cause a member (e.g., a hose) connected to the spray nozzle 10 to be detached. Meanwhile, in a case where the distance between the surface of the base material 20 and the tip of the spray nozzle 10 is more than 30 mm, efficiency in film formation is decreased. This is because it becomes more difficult for the carrier gas and the film material which have been sprayed from the spray nozzle 10 to reach the base material 20.

Note, however, that the distance between the surface of the base material 20 and the tip of the spray nozzle 10 does not necessarily need to fall within the above range, and is appropriately adjusted in accordance with, for example, the material(s) and/or the size of the film material, or the material(s) of the base material.

The control device controls the cold spray device 100 in accordance with information stored therein in advance and/or an input by an operator. Specifically, the control device controls, for example, (i) the pressure of the carrier gas which is supplied from the tank 110 to the heater 120, (ii) the temperature of the carrier gas which is heated by the heater 120, (iii) a kind and an amount of the film material which is supplied from the feeder 140, and (iv) the distance between the surface of the base material 20 and the spray nozzle 10.

In an embodiment of the present invention, the film material is sprayed onto the base material 20 by cold spray. Note, however, that the film material can be sprayed by other film forming methods. Examples of the other film forming methods include warm spraying, aerosol deposition, free jet PVD, flame spraying, wire flame spraying, powder flame spraying, wire/rod flame spraying, high velocity flame spraying, detonation spraying, electrical spraying, arc spraying, plasma spraying, and wire explosion spraying.

[Film Material]

In the cold spray device 100, a mixed powder material containing aluminum (Al), alumina ($Al_2O_3$), and nickel (Ni) is used as the film material. Details of the mixed powder material will be discussed later.

[Base Material]

In the cold spray device 100, a ceramic base material is used as the base material 20. The ceramic base material is a substantially plate-like member which is made of an insulating material. Examples of the insulating material include (i) nitride ceramics such as aluminum nitride and silicon nitride and (ii) oxide ceramics such as alumina, magnesia, zirconia, steatite, forsterite, mullite, titania, silica, and sialon. In an embodiment of the present invention, an example case is discussed in which zirconia is used as the insulating material of the ceramic base material.

[Metal-Ceramic Base Material]

Figure 1:
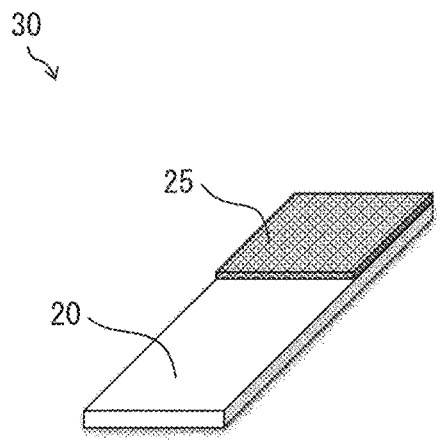
FIG. 1 is a view schematically illustrating a metal-ceramic base material in accordance with an embodiment of the present invention.

FIG. 1 is a view schematically illustrating a metal-ceramic base material 30. The metal-ceramic base material 30 includes the base material 20 and a metal film 25. The metal film 25 is a film formed on the base material 20 by cold spray, onto the base material 20, the mixed powder material containing aluminum, alumina, and nickel.

Figure 3:
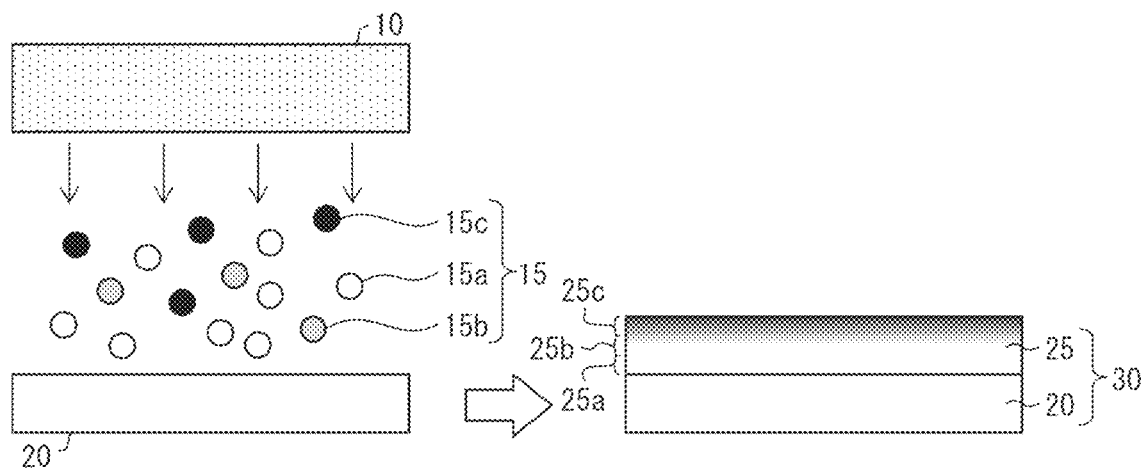
FIG. 3 is a view illustrating how a metal-ceramic base material in accordance with an embodiment of the present invention is produced.

The following description will discuss the metal-ceramic base material 30 in more detail with reference to FIG. 3. FIG. 3 is a view illustrating how the metal-ceramic base material 30 is produced.

As illustrated in FIG. 3, a plurality of alumina particles 15a, a plurality of aluminum particles 15b, and a plurality of nickel particles 15c are sprayed from the spray nozzle 10 onto the base material 20 (the drawing on the left of FIG. 3). This allows the metal film 25 to be formed on the base material 20 (the drawing on the right of FIG. 3). The metal film 25 has a single layer.

When the alumina particles 15a, the aluminum particles 15b, and the nickel particles 15c are cold sprayed onto the base material 20, an average air resistance against the alumina particles 15a is smaller than an average air resistance against the aluminum particles 15b, and the average air resistance against the aluminum particles 15b is smaller than an average air resistance against the nickel particles 15c. This creates differences among spraying speeds at which the alumina particles 15a, the aluminum particles 15b, and the nickel particles 15c are cold sprayed respectively. Specifically, the spraying speed of the alumina particles 15a is higher than the spraying speed of the aluminum particles 15b, and the spraying speed of the aluminum particles 15b is higher than the spraying speed of the nickel particles 15c. As a result, in the metal film 25, an alumina region 25a, an aluminum region 25b, and a nickel region 25c are formed in this order from a base material 20 side. Specifically, the alumina region 25a contains alumina particles more than aluminum particles and nickel particles. The aluminum region 25b contains aluminum particles more than alumina particles and nickel particles. The nickel region 25c contains nickel particles more than aluminum particles and alumina particles.

An air resistance exerted against particles that are being cold sprayed onto the base material 20 can be adjusted in accordance with a size, a shape, or the like of the particles. For example, two types of particles, namely, particles P1 and particles P2, are considered. In a case where each of the particles P1 is ball-shaped and each of the particles P2 is flat, an air resistance against the particles P2 is greater than that against the particles P1. In a case where the particles P1 are in a form of single individual particles and the particles P2 are in a form of groups of particles each of which group is made up of a plurality of particles that are connected to each other, an air resistance against the particles P2 is greater than that against the particles P1. Further, in a case where a plurality of particles are connected to each other, it is possible to increase an air resistance against the plurality of particles by providing the plurality of particles in a shape of a string of particles that are linked to each other (hereinafter referred to as "filament shape"). In a case where (i) both of the particles P1 and the particles P2 are ball-shaped and (ii) a volume of the particles P1 is greater than that of the particles P2, an air resistance against the particles P1 is greater than that against the particles P2. It is thus possible to adjust air resistances that are exerted respectively against the alumina particles 15a, the aluminum particles 15b, and the nickel particles 15c which are being cold sprayed. Further, the following two points (1) and (2) should be noted. (1) An air resistance exerted against particles that are being cold sprayed onto the base material 20 can be adjusted in various ways, and it is not practical to describe all of the various ways of adjustment. (2) It is not necessary to measure (or calculate) a specific value of an average air resistance against a plurality of particles. It is only necessary that observation of a cross-section of the metal film 25 show that a region mainly made from the alumina particles 15a, a region mainly made from the aluminum particles 15b, and a region mainly made from the nickel particles 15c are formed.

Furthermore, alumina, aluminum, and nickel each contain a plurality of particles. In reality, it is very difficult to adjust the plurality of particles to have an identical shape (e.g., a filament shape). The description above has stated that "When the alumina particles 15a, the aluminum particles 15b, and the nickel particles 15c are cold sprayed onto the base material 20, an average air resistance against the alumina particles 15a is smaller than an average air resistance against the aluminum particles 15b, and the average air resistance against the aluminum particles 15b is smaller than an average air resistance against the nickel particles 15c." It should be understood that the above statement does not necessarily apply to each individual particles, but describes a tendency of an average air resistance among a plurality of particles.

Introduction of the differences in spraying speed in accordance with particle types is done for the following reason.

Alumina is used for roughening the surface of the base material 20. As such, it is preferable that the alumina particles 15a reach the base material 20 earlier than the aluminum particles 15b and the nickel particles 15c. The aluminum particles 15b are sprayed onto a surface which has been roughened by the alumina. This allows the metal film 25 to be formed on the base material 20. The nickel particles 15c are sprayed at a spraying speed lower than that of the aluminum particles 15b. This allows the nickel particles 15c to be distributed widely over the aluminum region 25b.

The names "alumina region 25a," "aluminum region 25b," and "nickel region 25c" are used for convenience. The alumina region 25a, the aluminum region 25b, and the nickel region 25c do not necessarily have clear boundaries therebetween.

The alumina region 25a mainly includes the alumina particles 15a, but also includes the aluminum particles 15b and the nickel particles 15c. The aluminum region 25b mainly includes the aluminum particles 15b, but also includes the alumina particles 15a and the nickel particles 15c. The nickel region 25c mainly includes the nickel particles 15c, but also includes the alumina particles 15a and the aluminum particles 15b.

[Metal-Ceramic Joint Structure]

Figure 4:
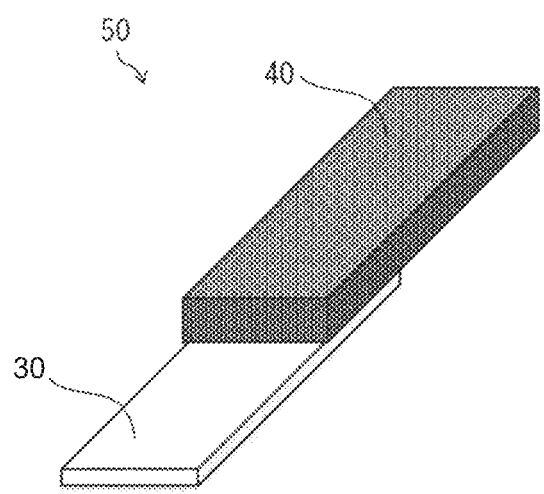
FIG. 4 is a view schematically illustrating a metal-ceramic joint structure in accordance with an embodiment of the present invention.

FIG. 4 is a view schematically illustrating a metal-ceramic joint structure 50. The metal-ceramic joint structure 50 includes the metal-ceramic base material 30 and a metal material 40. The metal material 40 is silver-soldered to the metal-ceramic base material 30. The metal material 40 has a melting point higher than that of a silver solder material.

Soldering is a method in which an alloy (solder) having a melting point lower than that of a member (a parent material) to be joined is melted so as to join the parent material and another member. Soldering allows joining a parent material and another member without melting the parent material itself. Heating means for melting the solder can be combustion of inflammable gas or the like, an electric heater, or the like. Silver soldering is a method in which silver is used as a solder material. In silver soldering, a flux material can also be used in order to suppress oxidation of a soldered portion.

Figure 5:
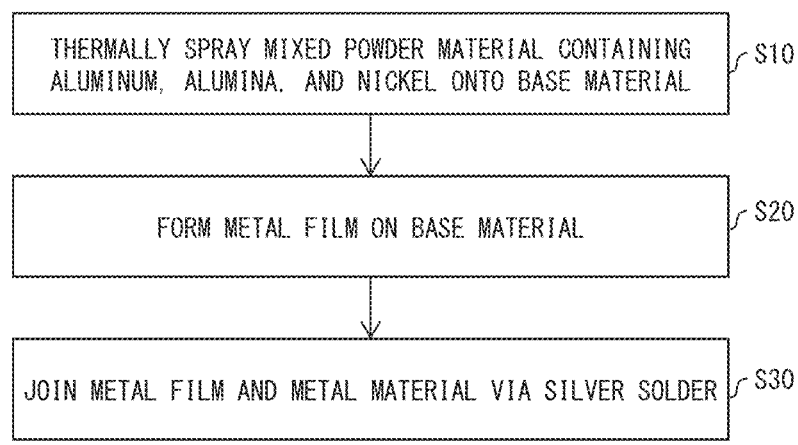
FIG. 5 is a flowchart of a method, in accordance with an embodiment of the present invention, for producing a metal-ceramic joint structure.

The following description will discuss a method for producing the metal-ceramic joint structure 50, with reference to FIG. 5. FIG. 5 is a flowchart showing a method for producing the metal-ceramic joint structure 50.

At S10, the mixed powder material containing aluminum, alumina, and nickel is thermally sprayed onto the base material 20. The base material 20 is a ceramic base material. At S20, the metal film 25 is formed on the base material 20 (film forming step). At S30, the metal film 25 and the metal material 40 are joined via silver solder (joining step). At this time, a flux material can also be used. Through S10 through S30 above, the metal-ceramic joint structure 50 is produced.

As described above, the metal material 40 has a melting point higher than that of the silver solder material. Examples of the metal material 40 include iron (melting point: 1535° C.), cobalt (melting point: 1495° C.), or the like.

Note that, in an embodiment of the present invention, a case in which the metal-ceramic base material 30 and the metal material 40 are joined by soldering (silver soldering) is discussed. Note, however, that the metal-ceramic base material 30 and the metal material 40 can be joined by other methods such as use of an adhesive, gluing, fixation with use of a bolt etc., or the like.

Further, in an embodiment of the present invention, a case in which the mixed powder material containing aluminum (Al), alumina (Al$_2$O$_3$), and nickel (Ni) is used as the film material. Note, however, that the following materials 1 through 10 can be used in place of nickel.
1. Pure Metal
   Copper (Cu), aluminum (Al), titanium (Ti), silver (Ag), nickel (Ni), zinc (Zn), tin (Sn), molybdenum (Mo), iron (Fe), tantalum (Ta), niobium (Nb), silicon (Si), or chromium (Cr)
2. Low-Alloy Steel
   Ancorsteel 100
3. Nickel Chromium Alloy
   50Ni-50Cr, 60Ni-40Cr, or 80Ni-20Cr
4. Nickel-Base Superalloy
   Alloy625, Alloy718, Hastelloy C, or In738LC
5. Stainless Steel
   SUS304/304L, SUS316/316L, SUS420, or SUS440
6. Zinc Alloy: Zn-20Al
7. Aluminum Alloy: A1100 or A6061
8. Copper Alloy: C95800 (Ni-AL Bronze) or 60Cu-40Zn
9. MCrAlY: NiCrAlY or CoNiCrAlY
10. Other: An alloy of pure metals among the pure metals in 1. above, an amorphous (quasicrystalline) metal, a composite material, a cermet, or a ceramic In a case where any of the materials 1 through 10 is used in place of nickel, technical ideas in accordance with embodiments of the present invention remain the same (e.g., When alumina particles, aluminum particles, and particles of any one of the materials 1 through 10 are cold sprayed onto the base material 20, an average air resistance against the alumina particles is smaller than an average air resistance against the aluminum particles, and the average air resistance against the aluminum particles is smaller than an average air resistance against the particles of the any one of the materials 1 through 10.").

Example

The following description will discuss an Example. In the Example, metal-ceramic base materials 30 were produced under the following conditions.
(1) Pressure of the carrier gas: 0.9 MPa (at the exit of the tank 110)
(2) Temperature of the carrier gas: 250° C. (at the exit of the heater 120)
(3) Film formation speed: 10 mm/s
(4) Distance between the surface of the base material 20 and the tip of the spray nozzle: 10 mm
(5) Nozzle diameter: 5 mm in diameter
(6) Mixed powder material (in weight ratio): 7% of aluminum, 39% of alumina, and 54% of nickel
(7) Characteristics of each powder of the mixed powder material
   Aluminum particles: Substantially ball-shaped, particle size: approximately 40 μm
   Alumina particles: Substantially ball-shaped, particle size: approximately 10 μm
   Nickel Particles:
   Pattern A:
   Filament-shaped (particles are connected to each other so as to form a string).
   Each particle is substantially ball-shaped and has a particle size of approximately 3 μm.
   Pattern B:
   Each particle is substantially ball-shaped and has a particle size of approximately 3 μm.
   Pattern C:
   Spiky (a surface of a particle has a sharp-pointed portion)
   Each particle is similar in size to a ball-shaped particle that has a particle size of approximately 3 μm.
(8) Base material 20: Zirconia material (20 mm×50 mm×t2 mm)
(9) Metal material 40: Iron material (20 mm×70 mm×t4 mm)
(10) Silver solder material: BAg-7
(11) Soldering processing: Induction heating at approximately 700° C.

Under the conditions (1) through (11) above, the metal-ceramic base materials 30 were produced with respect to the respective patterns A through C.

Figure 6:
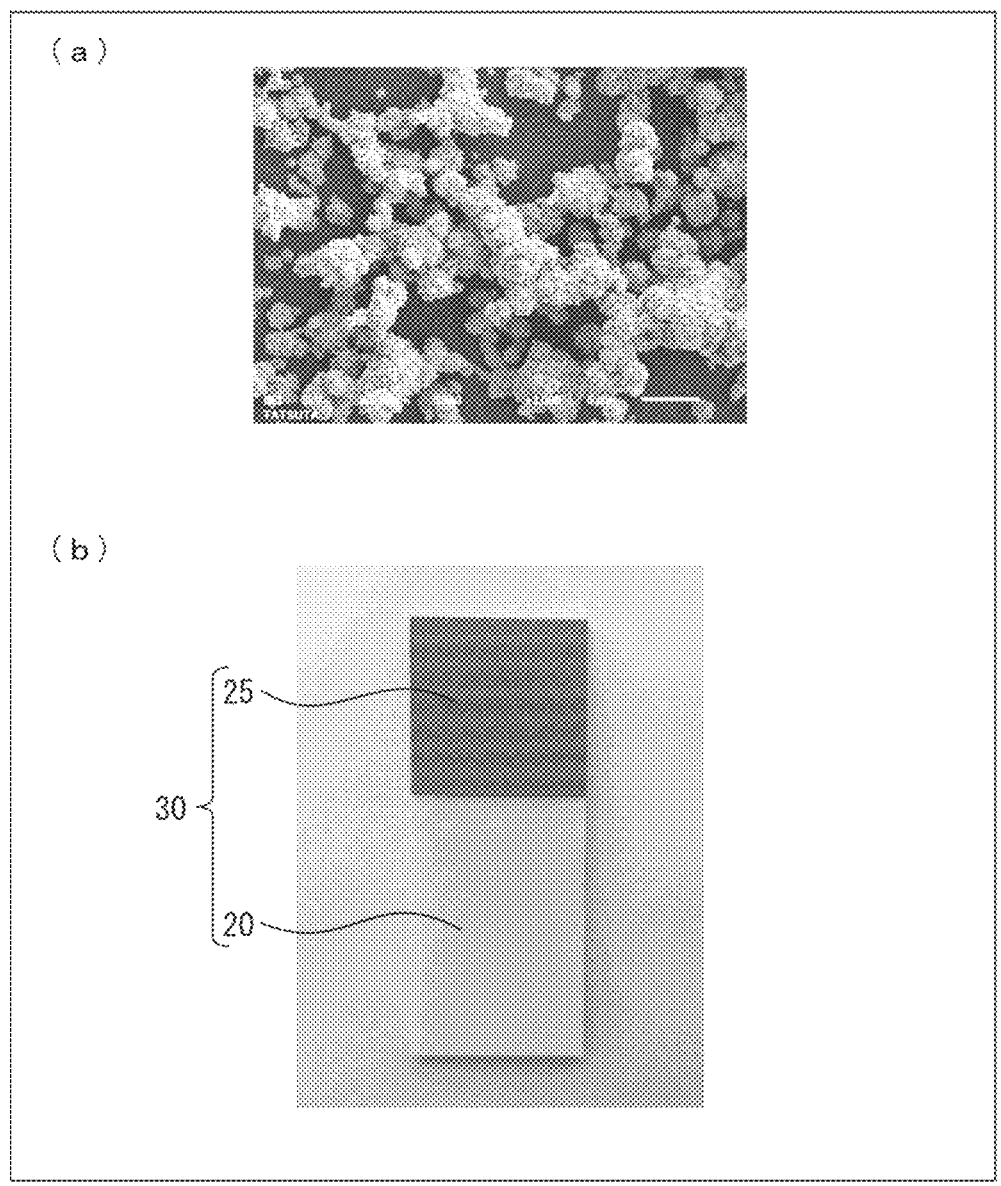
FIG. 6 shows photographs of a result of a pattern A. (a) of FIG. 6 is a photograph of filament-shaped nickel particles. (b) of FIG. 6 is a photograph of a metal-ceramic base material produced.
Figure 7:
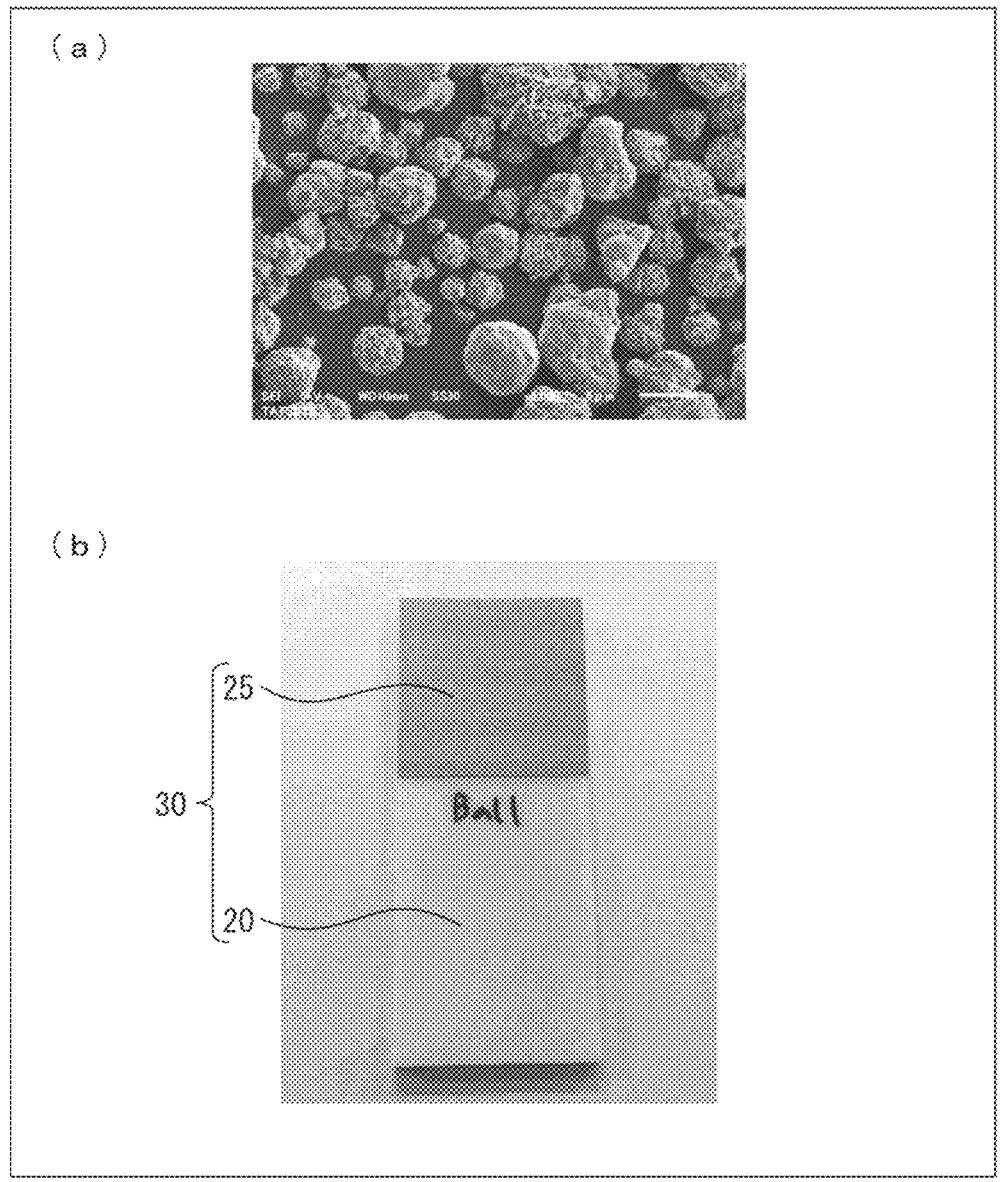
FIG. 7 shows photographs of a result of a pattern B. (a) of FIG. 7 is a photograph of ball-shaped nickel particles. (b) of FIG. 7 is a photograph of a metal-ceramic base material produced.
Figure 8:
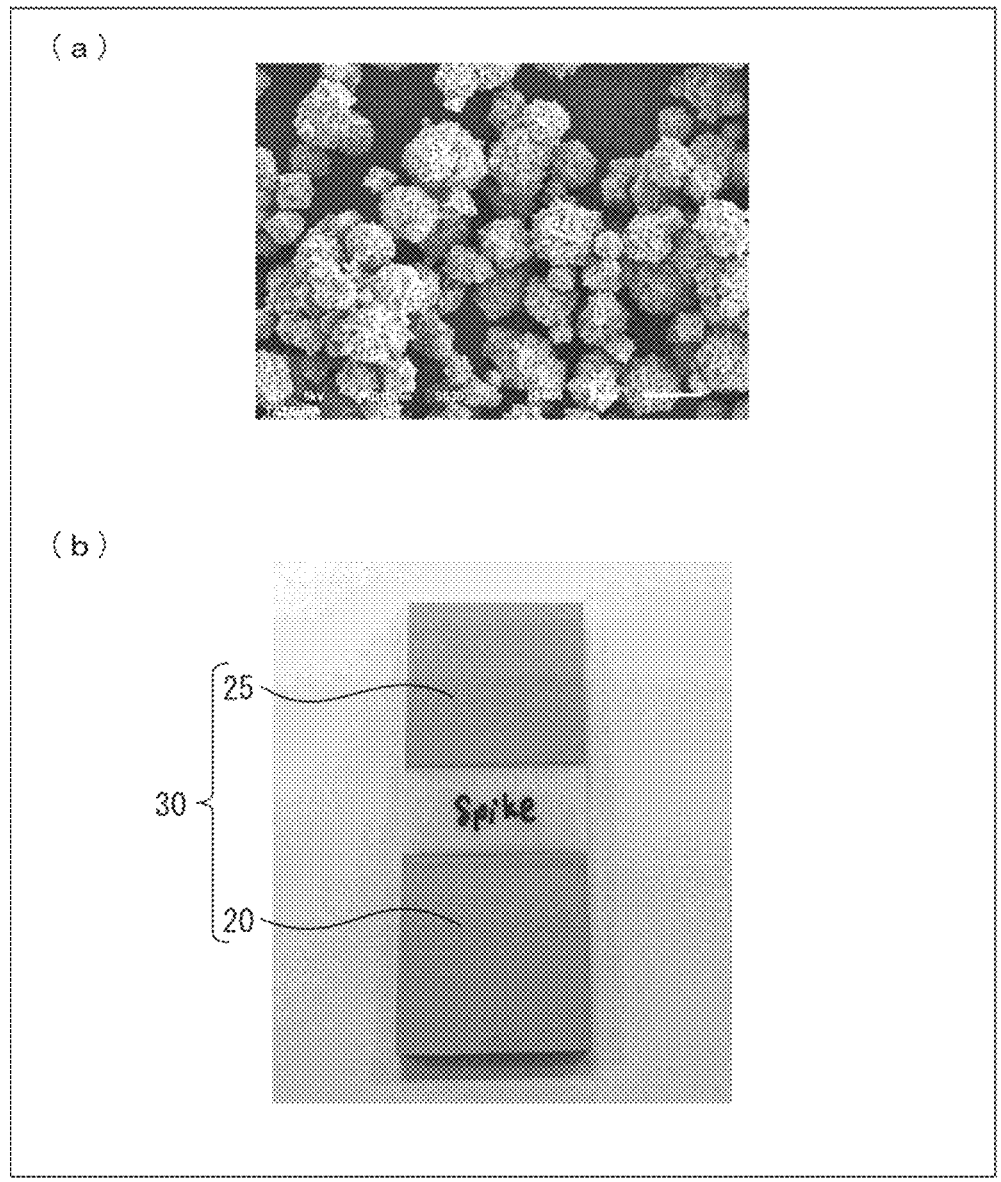
FIG. 8 shows photographs of a result of a pattern C. (a) of FIG. 8 is a photograph of spiky nickel particles. (b) of FIG. 8 is a photograph of a metal-ceramic base material produced.

FIG. 6 shows photographs of a result of the pattern A. (a) of FIG. 6 is a photograph of filament-shaped nickel particles. (b) of FIG. 6 is a photograph of a metal-ceramic base material 30 produced. FIG. 7 shows photographs of a result of the pattern B. (a) of FIG. 7 is a photograph of ball-shaped nickel particles. (b) of FIG. 7 is a photograph of a metal-ceramic base material 30 produced. FIG. 8 shows photographs of a result of the pattern C. (a) of FIG. 8 is a photograph of spiky nickel particles. (b) of FIG. 8 is a photograph of a metal-ceramic base material 30 produced.

In the pattern A, nickel particles are formed in a filament shape ((a) of FIG. 6). This causes the nickel particles 15*c* to be sprayed at a spraying speed lower than those of the alumina particles 15*a* and the aluminum particles 15*b*, so that the nickel particles 15*c* are distributed widely over the aluminum region 25*b*. Comparison between (b) of FIG. 6, (b) of FIG. 7, and (b) of FIG. 8 shows that a surface of a metal film 25 in (b) of FIG. 6 appears to be the darkest. This indicates that more nickel particles are distributed on the surface of the metal film 25 in (b) of FIG. 6. This point will be discussed in more detail with reference to FIGS. 9 through 11.

Figure 9:
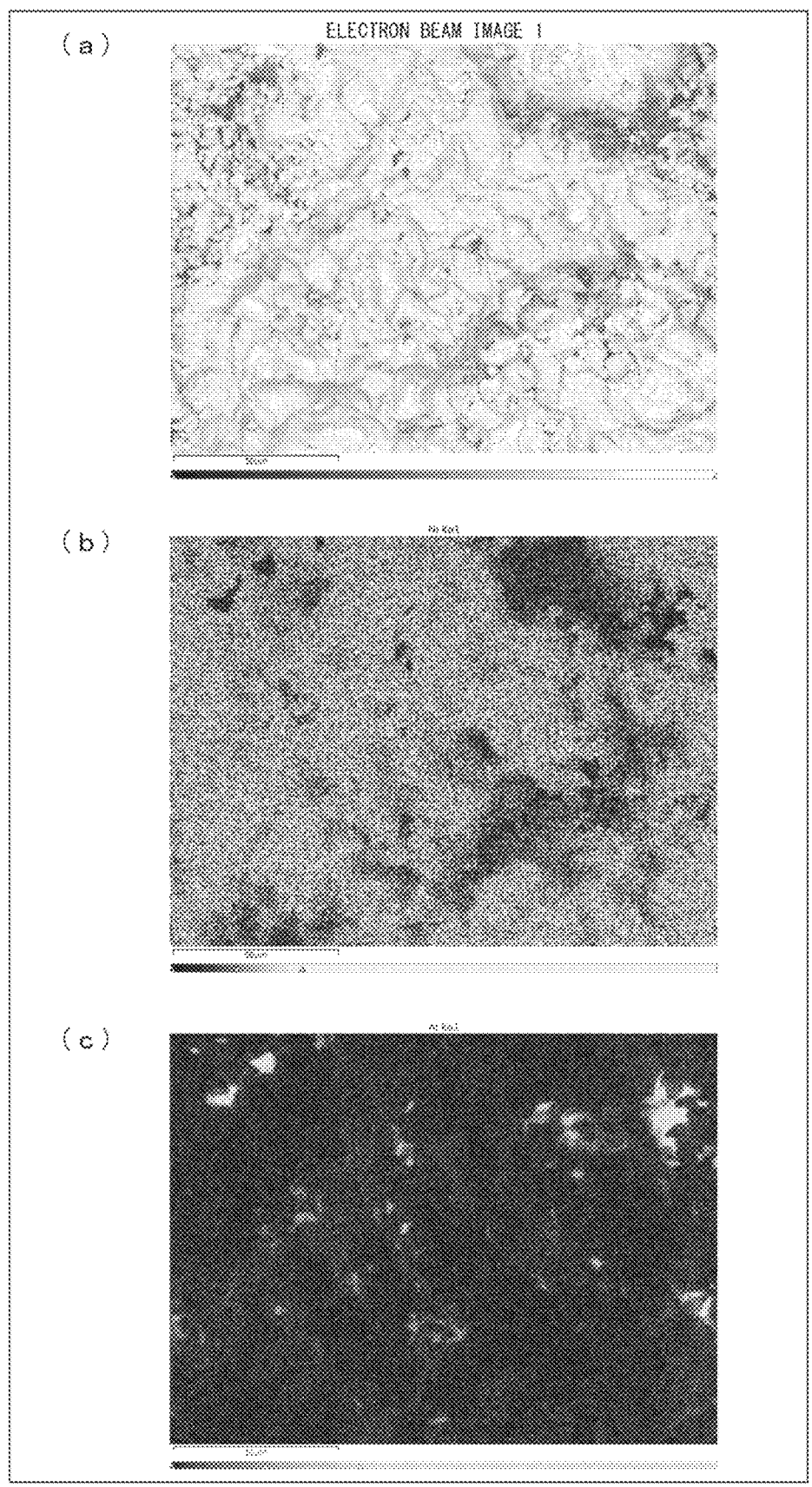
FIG. 9 shows photographs of a result of the pattern A. (a) of FIG. 9 is a photograph of a surface of a metal film. (b) of FIG. 9 is a photograph of nickel distributed on the surface of the metal film. (c) of FIG. 9 is a photograph of aluminum distributed on the surface of the metal film.
Figure 10:
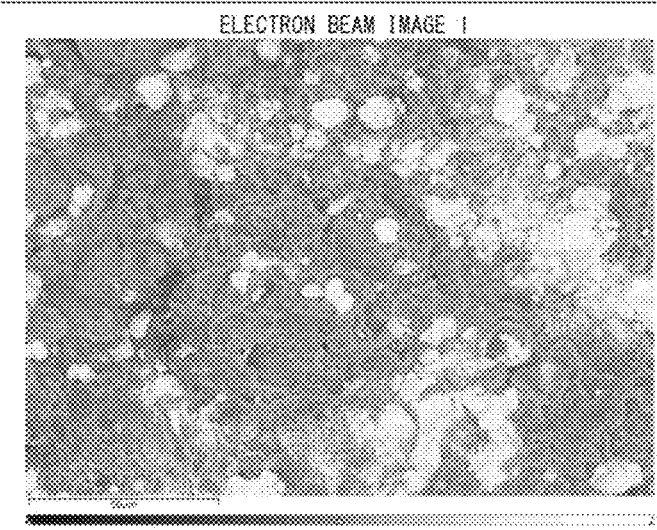
FIG. 10 shows photographs of a result of the pattern B. (a) of FIG. 10 is a photograph of a surface of a metal film. (b) of FIG. 10 is a photograph of nickel distributed on the surface of the metal film. (c) of FIG. 10 is a photograph of aluminum distributed on the surface of the metal film.
Figure 10:
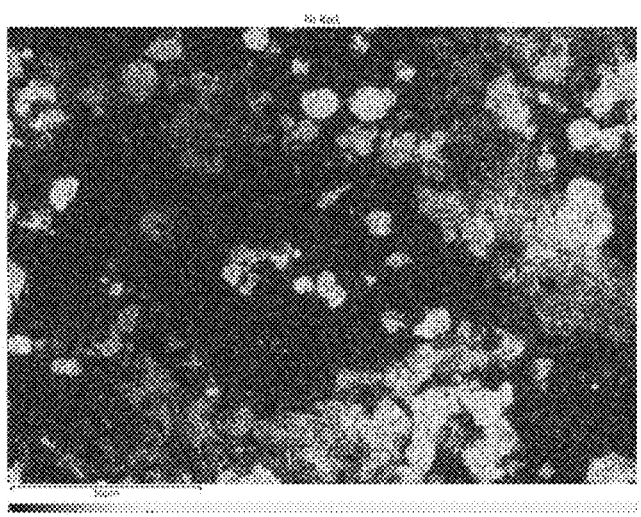
Figure 10:
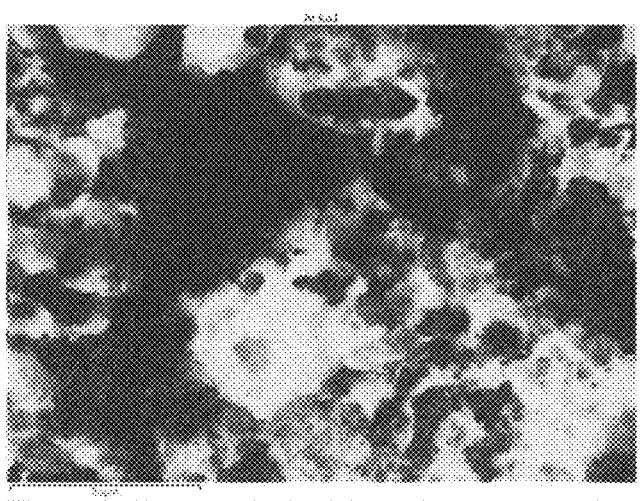
Figure 11:
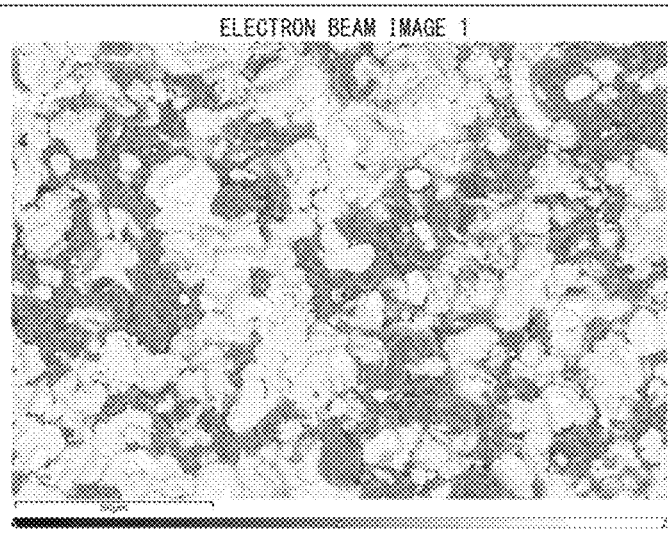
FIG. 11 shows photographs of a result of the pattern C. (a) of FIG. 11 is a photograph of a surface of a metal film. (b) of FIG. 11 is a photograph of nickel distributed on the surface of the metal film. (c) of FIG. 11 is a photograph of aluminum distributed on the surface of the metal film.
Figure 11:
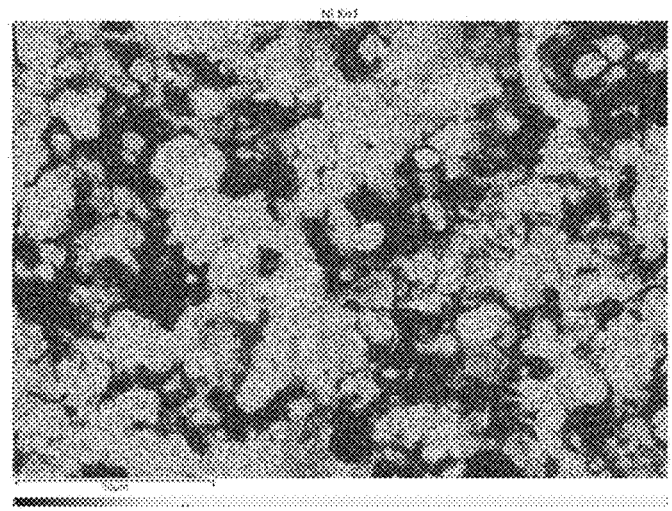
Figure 11:
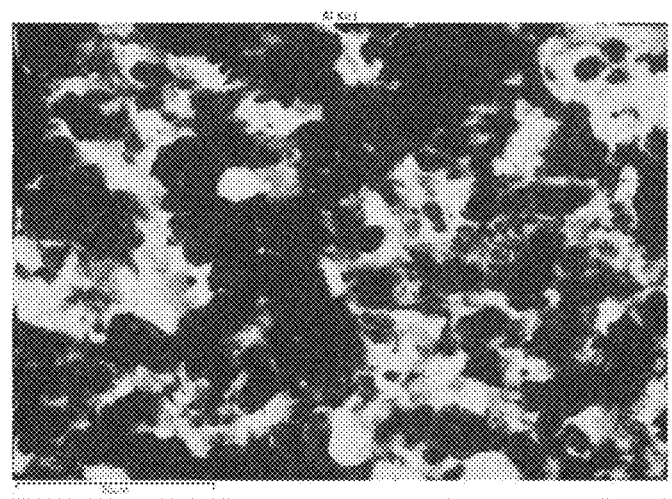

FIG. 9 shows photographs of a result of the pattern A. (a) of FIG. 9 is a photograph of a surface of a metal film 25. (b) of FIG. 9 is a photograph of nickel distributed on the surface of the metal film 25. (c) of FIG. 9 is a photograph of aluminum distributed on the surface of the metal film 25. FIG. 10 shows photographs of a result of the pattern B. (a) of FIG. 10 is a photograph of a surface of a metal film 25. (b) of FIG. 10 is a photograph of nickel distributed on the surface of the metal film 25. (c) of FIG. 10 is a photograph of aluminum distributed on the surface of the metal film 25. FIG. 11 shows photographs of a result of the pattern C. (a) of FIG. 11 is a photograph of a surface of a metal film 25. (b) of FIG. 11 is a photograph of nickel distributed on the surface of the metal film 25. (c) of FIG. 11 is a photograph of aluminum distributed on the surface of the metal film 25.

Comparison of FIGS. 9 through 11 shows that a ratio of the nickel distributed on the surface of the metal film 25 of the pattern A is greater than a ratio of the nickel distributed on the surface of the metal film 25 of the pattern C, and the ratio of the nickel distributed on the surface of the metal film 25 of the pattern C is greater than a ratio of the nickel distributed on the surface of the metal film 25 of the pattern B. In the pattern A, the nickel is distributed over the entire surface of the metal film 25, and the aluminum is hardly distributed. In the pattern B, the aluminum appears to be distributed on the surface of the metal film 25 at a ratio greater than that of the nickel. In the pattern C, ratios of the aluminum and the nickel distributed on the surface of the metal film 25 appears to be similar to each other.

Figures 12, 13:
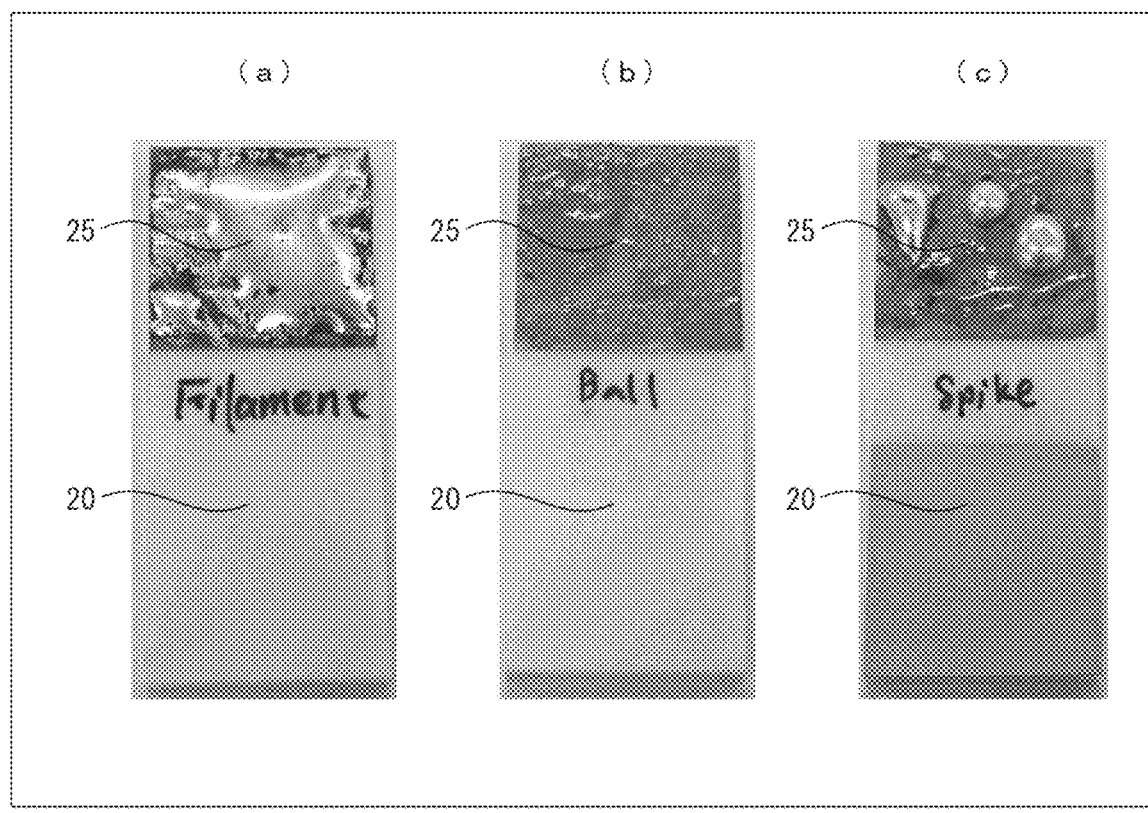
FIG. 12 shows photographs of results of solder wettability. (a) of FIG. 12 shows a result of the pattern A. (b) of FIG. 12 shows a result of the pattern B. (c) of FIG. 12 shows a result of the pattern C.
FIG. 13 is a view for explaining a state of film formation in a case where weight ratios in a mixed powder material are varied.

Further, the metal films 25 produced according to the patterns A through C were examined in terms of solder wettability. Results are shown in FIG. 12. FIG. 12 shows photograph of results of solder wettability. (a) of FIG. 12 shows a result of the pattern A. (b) of FIG. 12 shows a result of the pattern B. (b) of FIG. 12 shows a result of the pattern C.

As indicated by FIG. 12, it was shown that a level of solder wettability decreased in this order: the pattern A, the pattern C, and the pattern B. This, too, verifies that the pattern A is the most favorable in terms of the metal film 25.

Note that, in all of the patterns A through C, at least part of the nickel is exposed on the surface, and it is accordingly possible to join the base material 20 and the metal material 40 by silver soldering a portion at which the nickel is exposed and the metal material 40 together.

[Mixing Ratio in Mixed Powder Material]

The following description will discuss, with reference to FIG. 13, a preferable mixing ratio of aluminum (Al), alumina ($Al_2O_3$), and nickel (Ni). FIG. 13 is a view for explaining a state of film formation in a case where weight ratios in a mixed powder material are varied.

A weight ratio of aluminum was varied to 0%, 7%, and 14%. A weight ratio of alumina was varied to 0%, 16%, 32%, and 39%. A remaining ratio is a weight ratio of nickel. "Good" indicates that a state of film formation was good. "Not Good" indicates that a film was partially formed but the metal film 25 was not adhering tightly enough to the base material 20. "Bad" indicates that no film was formed.

As shown in FIG. 13, no film formation was observed in a case where the weight ratio of aluminum was 0%. Film formation was observed in cases where the weight ratio of aluminum was 7% and 14%, respectively. Particularly in a case where aluminum was 7%, alumina was 39%, and nickel was 54% and in a case where aluminum was 14%, alumina was 32%, and nickel was 54%, an excellent state of film formation was observed.

Figure 14:
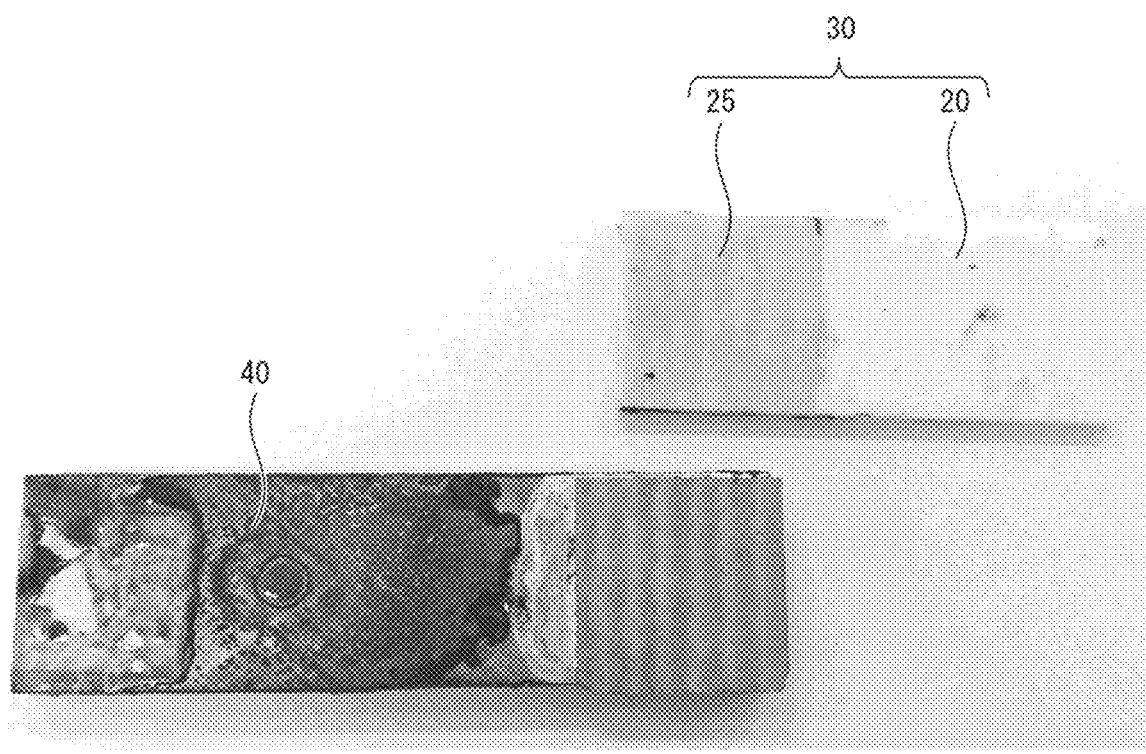
FIG. 14 is a photograph showing a state in which a metal material has peeled off from a metal-ceramic base material in a case where a mixing ratio of aluminum is more than 14% in terms of weight ratio.
Figure 15:
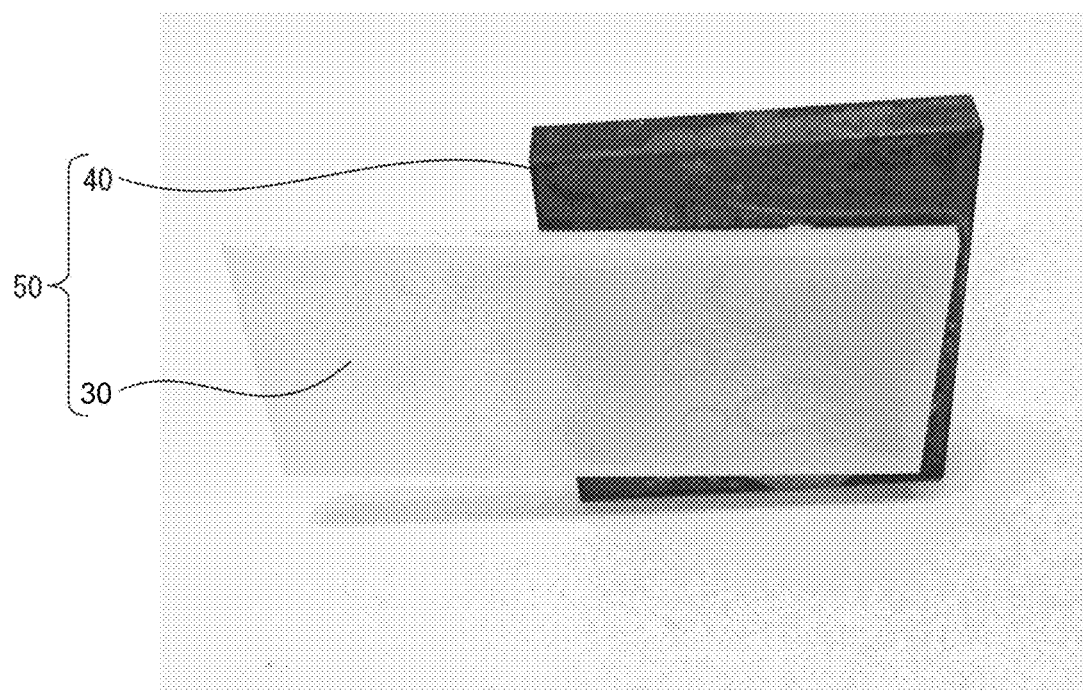
FIG. 15 is a photograph showing a state in which a metal material and a metal-ceramic base material are joined in a case where aluminum is contained in a mixed powder material in a weight ratio of not less than 7% and not more than 14%.

Note that it was confirmed by the inventor of the present invention that the state of film formation is not favorable in cases where the mixing ratio of aluminum is less than 7% and more than 14%, respectively, in terms of weight ratio. In particular, in a case where the mixing ratio of aluminum in terms of weight ratio is more than 14%, it becomes easier for the metal material 40 to peel off from the metal-ceramic base material 30. This point is shown in FIG. 14. FIG. 14 is a photograph showing a state in which a metal material 40 has peeled off from a metal-ceramic base material 30 in a case where the mixing ratio of aluminum is more than 14% in terms of weight ratio. Also from a view point of preventing such a situation, it is preferable that the mixture ratio of aluminum in the mixed powder material be adjusted to not less than 7% and not more than 14% in terms of weight ratio. In a case where the weight ratio of aluminum is not less than 7% and not more than 14%, the metal material 40 and the metal-ceramic base material 30 are joined successfully. This point is shown in FIG. 15. FIG. 15 is a photograph showing a state in which a metal material 40 and a metal-ceramic base material 30 are joined in a case where aluminum is contained in a mixed powder material in a weight ratio of not less than 7% and not more than 14%. In the case in which aluminum is contained in the mixed powder material in the weight ratio of not less than 7% and not more than 14%, the metal material 40 and the metal-ceramic base material 30 are joined well in the metal-ceramic joint structure 50, and the metal material 40 does not easily peel off from the metal-ceramic base material 30.

[Recap]

A metal-ceramic base material in accordance with Aspect 1 of the present invention is a metal-ceramic base material to be joined to a metal material, including: a ceramic base material; and a metal film provided on the ceramic base material, the metal film being formed by thermal spray of a mixed powder material containing aluminum, alumina, and nickel, at least part of the nickel being exposed on a surface of the metal film.

According to the configuration above, at least part of the nickel is exposed on the surface of the metal film. A melting point of nickel is 1453° C., which is higher than a soldering temperature of generally used silver solder. Accordingly, it becomes possible to join the metal-ceramic base material and the metal material by silver soldering.

Further, the metal film is a film formed by thermally spraying, onto the ceramic base material, the mixed powder material containing the aluminum, the alumina, and the nickel, and therefore is constituted by a single layer. Accordingly, it also becomes possible to prevent a conventional problem that two layers (an aluminum layer and a nickel layer) peel off from each other.

Note that the metal-ceramic base material in accordance with Aspect 1 of the present invention can also be expressed as below.

The metal-ceramic base material in accordance with Aspect 1 of the present invention is a metal-ceramic base material to be joined to a metal material, including: a ceramic base material; and a metal film provided on the ceramic base material, the metal film containing aluminum, alumina, and nickel, at least part of the nickel being exposed on a surface of the metal film.

In Aspect 2 of the present invention, the metal-ceramic base material in accordance with Aspect 1 is configured such that: the mixed powder material contains a plurality of alumina particles, a plurality of aluminum particles, and a plurality of nickel particles; and when the plurality of alumina particles, the plurality of aluminum particles, and the plurality of nickel particles are thermally sprayed onto the ceramic base material, an average air resistance against the plurality of alumina particles is smaller than an average air resistance against the plurality of aluminum particles, and the average air resistance against the plurality of aluminum particles is smaller than an average air resistance against the plurality of nickel particles.

According to the configuration above, when the mixed powder material is thermally sprayed onto the ceramic base material, the alumina particles, against which the smallest air resistance is exerted, reaches the ceramic base material first so as to roughen a surface of the ceramic base material. Subsequently, the aluminum particles are sprayed onto the thus roughened surface of the ceramic base material. This allows the metal film to be formed on the ceramic base material. The nickel particles receive the greatest air resistance exerted thereon. This allows the nickel particles to be widely distributed over the aluminum particles.

Accordingly, a ratio (an area) of the nickel exposed on the surface of the metal film is increased. This allows the metal film and the metal material to be joined by silver soldering.

Note that an air resistance which is exerted against particles that are being thermally sprayed onto the ceramic base material can be adjusted in various ways in accordance with a size, a shape, or the like of the particles.

In Aspect 2 of the present invention, the metal-ceramic base material in accordance with Aspect 1 can also be expressed as below. In Aspect 2 of the present invention, the metal-ceramic base material in accordance with Aspect 1 is configured such that a cross-section of the metal film includes a first region that is mainly made from the alumina, a second region that is mainly made from the aluminum, and a third region that is mainly made from the nickel, the first region, the second region, and the third region being provided in this order from a side on which the ceramic base material is provided.

In Aspect 3 of the present invention, the metal-ceramic base material in accordance with Aspect 2 can be configured such that the plurality of nickel particles include filament-shaped particles.

According to the configuration above, it is possible to increase an average air resistance which is exerted against the plurality of nickel particles that are being thermally sprayed onto the ceramic base material. This causes a further increase in ratio (area) of the nickel exposed on the surface of the metal film, and accordingly allows the metal film and the metal material to be joined more reliably by silver soldering.

In Aspect 4 of the present invention, the metal-ceramic base material in accordance with any one of Aspects 1 through 3 can be configured such that the mixed powder material contains the aluminum in a weight ratio of not less than 7% and not more than 14%.

In a case where the aluminum contained in the mixed powder material is in a weight ratio of not less than 7% and not more than 14%, the metal film can be formed on the ceramic base material more reliably. In a case where the aluminum contained in the mixed powder material is in a weight ratio of not more than 14%, the metal-ceramic base material and the metal material can be joined more firmly.

In Aspect 5 of the present invention, the metal-ceramic base material in accordance with any one of Aspects 1 through 4 can be configured such that the ceramic base material contains zirconia.

According to the configuration above, the metal film can be formed on the ceramic base material more reliably.

A metal-ceramic joint structure in accordance with Aspect 6 of the present invention is a metal-ceramic joint structure including: a ceramic base material; a metal film provided on the ceramic base material, the metal film being formed by thermal spray of a mixed powder material containing aluminum, alumina, and nickel, at least part of the nickel being exposed on a surface of the metal film; and a metal material joined to the metal film.

According to the configuration above, it is possible to achieve an effect similar to that of the metal-ceramic base material.

In Aspect 7 of the present invention, the metal-ceramic joint structure in accordance with Aspect 6 can be configured such that the metal material is joined to the metal film with use of a silver solder material and has a melting point higher than that of the silver solder material.

According to the configuration above, the metal film and the metal material can be joined more firmly by silver soldering.

A method, in accordance with Aspect 8 of the present invention, for producing a metal-ceramic joint structure is a method for producing a metal-ceramic joint structure, including: a film forming step of performing thermal spray of a mixed powder material onto a ceramic base material so as to form a metal film on the ceramic base material, the mixed powder material containing aluminum, alumina, and nickel; and a joining step of joining the metal film and a metal material.

According to the configuration above, it is possible to achieve an effect similar to that of the metal-ceramic base material.

In Aspect 9 of the present invention, the method in accordance with Aspect 8 can be configured such that the thermal spray is performed by a cold spray method.

According to the configuration above, an effect similar to that of the metal-ceramic base material can be achieved with use of a cold spray method in which a carrier gas having a temperature lower than that of a melting point or a softening temperature of the film material is sprayed.

A mixed powder material in accordance with Aspect 10 of the present invention is a mixed powder material to be thermally sprayed onto a ceramic base material, including: a plurality of alumina particles; a plurality of aluminum particles; and a plurality of nickel particles, an average air resistance against the plurality of alumina particles being smaller than an average air resistance against the plurality of aluminum particles, the average air resistance against the plurality of aluminum particles being smaller than an average air resistance against the plurality of nickel particles.

According to the configuration above, it is possible to achieve an effect similar to that of the metal-ceramic base material. The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10: spray nozzle
15a: alumina particles
15b: aluminum particles
15c: nickel particles
20: base material 25: metal film
25a: alumina region
25b: aluminum region
25c: nickel region
30: metal-ceramic base material
40: metal material
50: metal-ceramic joint structure
100: cold spray device
110: tank
120: heater
140: feeder
150: base material holder

The invention claimed is:

1. A metal-ceramic base material to be joined to a metal material, comprising:
   a ceramic base material; and
   a metal film provided on the ceramic base material, the metal film comprising a plurality of alumina particles, a plurality of aluminum particles, and a plurality of nickel particles, wherein at least part of the nickel particles are exposed on a surface of the metal film and the plurality of nickel particles include filament-shaped particles,
   wherein a cross-section of the metal film includes a first region that is mainly alumina particles, a second region that is mainly aluminum particles, and a third region that is mainly nickel particles, the first region, the second region, and the third region being provided in this order from a side on which the ceramic base material is provided, and
   wherein an average air resistance against the plurality of alumina particles is smaller than an average air resistance against the plurality of aluminum particles, and the average air resistance against the plurality of aluminum particles is smaller than an average air resistance against the plurality of nickel particles, each average air resistance being measured when the plurality of alumina particles, the plurality of aluminum particles, and the plurality of nickel particles are thermally sprayed onto the ceramic base material.

2. The metal-ceramic base material as set forth in claim 1, wherein the metal film comprises alumina in a weight ratio of not less than 32% and not more than 39% and aluminum in a weight ratio of not less than 7% and not more than 14%.

3. The metal-ceramic base material as set forth in claim 1, wherein the ceramic base material contains zirconia.

4. A metal-ceramic joint structure comprising:
   a metal-ceramic base material recited in claim 1; and
   a metal material joined to the metal film.

5. The metal-ceramic joint structure as set forth in claim 4, wherein the metal material has a melting point higher than that of a silver solder material.

6. A mixed powder material comprising:
   a plurality of alumina particles;
   a plurality of aluminum particles; and
   a plurality of nickel particles, wherein the plurality of nickel particles include filament-shaped particles, and
   an average air resistance against the plurality of alumina particles being smaller than an average air resistance against the plurality of aluminum particles, the average air resistance against the plurality of aluminum particles being smaller than an average air resistance against the plurality of nickel particles, each average air resistance being measured when the plurality of alumina particles, the plurality of aluminum particles, and the plurality of nickel particles are thermally sprayed onto a ceramic base material.

7. A method for producing a metal-ceramic joint structure, comprising:
   a film forming step of performing thermal spray of a mixed powder material onto a ceramic base material so as to form the metal-ceramic base material of claim 1, the mixed powder material containing aluminum, alumina, and nickel; and
   a joining step of joining the metal film and a metal material.

8. The method as set forth in claim 7, wherein the thermal spray is performed by a cold spray method.

* * * * *